(12) United States Patent
Enderle et al.

(10) Patent No.: US 6,233,921 B1
(45) Date of Patent: May 22, 2001

(54) METHOD FOR REDUCING HARMFUL EXHAUST GAS EMISSIONS OF A SPARK-IGNITION ENGINE OPERATING WITH A LEAN FUEL/AIR MIXTURE

(75) Inventors: Christian Enderle, Baltmannsweiler; Andreas Hertzberg, Stuttgart; Klaus Roessler, Altbach, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/381,923
(22) PCT Filed: Mar. 14, 1998
(86) PCT No.: PCT/EP98/01491
§ 371 Date: Jan. 14, 2000
§ 102(e) Date: Jan. 14, 2000
(87) PCT Pub. No.: WO98/42970
PCT Pub. Date: Oct. 1, 1998

(30) Foreign Application Priority Data

Mar. 25, 1997 (DE) ................................ 197 12 356

(51) Int. Cl.⁷ ............................ F02D 13/02; F02D 41/34; F02D 33/00
(52) U.S. Cl. ................................ 60/274; 60/285; 123/295
(58) Field of Search ..................... 123/295, 305; 60/274, 285

(56) References Cited

U.S. PATENT DOCUMENTS 5,848,529 * 12/1998 Katoh et al. ............................ 60/274

FOREIGN PATENT DOCUMENTS

| 196 31 986 A1 | 2/1998 | (DE) . |
| 0752521 A1 | 1/1997 | (EP) . |
| 60-150412 | 8/1985 | (JP) . |
| 7-158473 | 5/1995 | (JP) . |
| 9-195839 | 7/1997 | (JP) . |

* cited by examiner

Primary Examiner—Tony M. Argenbright
(74) Attorney, Agent, or Firm—Evenson, McKeown, Edwards & Lenahan, P.L.L.C.

(57) ABSTRACT

A method reduces harmful exhaust-gas emissions of a spark-ignition, direct fuel injection engine operated with a lean fuel/air mixture. Under part load, the engine is operated in the stratified-charge mode with a $\lambda$ value of >1, and to reduce nitrogen oxides adsorbed on a catalyst, a jump to a homogeneous mode with air ratios of lambda <1 is carried out at specific intervals by throttling of the air quantity supplied and/or by an increase in the fuel injection quantity. In a first step, the air quantity in the combustion space is reduced by changes in the valve control times and, in a second step, a transition is made from the stratified-charge mode to the homogeneous mode, with a $\lambda$ value of less than 1 being set.

4 Claims, 2 Drawing Sheets

METHOD FOR REDUCING HARMFUL EXHAUST GAS EMISSIONS OF A SPARK-IGNITION ENGINE OPERATING WITH A LEAN FUEL/AIR MIXTURE

BACKGROUND OF THE INVENTION

This application claims the priority of PCT/EP98/01491, filed Mar. 14, 1998 and 197 12 356.2, filed Mar. 25, 1997, the disclosure of which is expressly incorporated by reference herein.

The present invention relates to a method for reducing harmful exhaust-gas emissions of a spark-ignition engine operated with a lean fuel/air mixture and having direction fuel injection. More particularly, the inventors relate to a method wherein under part load the engine being operated in the stratified-charge mode with a lambda value of $\lambda>1$, and, in order to reduce nitrogen oxides adsorbed on a catalyst, a transition to a homogeneous mode with air ratios of $\lambda<1$ being carried out at specific intervals by at least one of throttling of the air quantity supplied and/or by an increase in the fuel injection quantity.

It is known that NOx storage catalysts are suitable for the aftertreatment of exhaust gas in so-called lean-burn engines. With lambda values $(\lambda)>1$, nitrogen oxides are stored, lambda representing the ratio of the air quantity supplied to a theoretical air requirement for combustion. In order to reduce the nitrogen oxides adsorbed on the catalyst, a jump to air ratios $\lambda<1$ is necessary at specific intervals.

In conventional lean-burn engines which have a homogeneous fuel/air mixture and the leanness of which can be brought at least to lambda values of $\lambda=1.6$, in principle enrichment can take place while the air quantity remains the same. In this case, the engine torque can be kept constant by retarding the ignition timing. By additional adjustment of the throttle valve for the air supply, the retard of the ignition timing can be limited to only a few work cycles.

A spark-ignition engine with direct injection can, however, be made substantially leaner. In order to obtain consumption values which are as low as possible, such an engine is run unthrottled, that is with a constant air quantity, in the usual way. This engine, therefore, is run in the so-called stratified-charge mode in most operating states. In contrast to homogeneous operation with a lambda value of $\lambda=1$, with the fuel already being injected during the suction stroke of a piston, in charge stratification or a stratified-charge mode, the fuel is injected only just before ignition in the compression stroke of the piston. Due to largely unthrottled operation, the engine is operated with a correspondingly high air excess.

Alternation between charge stratification and homogeneous operation, and vice versa, is designated as operating-mode alternation. Since exhaust-gas aftertreatment with a three-way catalyst is not possible in the case of a lean exhaust-gas composition of this kind, an NOx storage catalyst, for example, is used instead, which, as mentioned, then has to be regenerated at regular intervals when there are air ratios $\lambda<1$, in order to desorb the adsorbed nitrogen oxides again and subsequently reduce them.

This means that, in the partial-load mode, a transition to air ratios of $\lambda<1$ and back again, with the air quantity remaining the same, would be accompanied by a very pronounced load change. For this reason, the intake air quantity must be adapted accordingly, and, at the same time, there must also be a transition from the operating mode "stratified-charge mode" to a "homogeneous mixture mode". Operation with a homogeneous mixture is possible only when there are lambda values of $\lambda<1.6$.

It is known from EP 0,752,521 A1 to adjust the throttle valve accordingly in order to adapt the air quantity. Here, however, there is the problem that, because of the air quantities stored in the flow path between the throttle valve and the intake region of a combustion space or as far as the combustion space, a correspondingly long time is required until air-quantity changes brought about by the adjustment of the throttle valves have an effect in the combustion space. The engine has to be run in an adverse way according to intermediate values for a relatively long period of time. The same applies to a subsequently repeated increase in the air quantity from rich to lean and from the homogeneous mode to the stratified-charge mode. Moreover, each cylinder has two intake ducts having throttle valves regulated in a load-dependent manner.

DE 27 47 885 A1 discloses a method for the reduction of harmful exhaust-gas emissions of a multi-cylinder internal combustion engine, in which one half of the cylinders is to be operated with a rich mixture and the other with a lean mixture. The exhaust-gas intervals with the same composition thereby become longer or their frequency becomes lower, depending on the number of cylinders in the internal combustion engine. The degree of conversion of a selective catalyst is thus to be markedly improved or the emission of harmful exhaust gases reduced. A similar method is described in GB-C-1,492,228.

DE 39 40 752 A1 describes a method for controlling a spark-ignition engine without a throttle valve with the aid of variable inlet-valve opening durations. This method is intended to adapt the masses of air and fuel to one another in a permanently optimum manner in all driving states, even when there are sudden changes in the accelerator-pedal signal, in order to achieve a high degree of driving comfort, without misfires, and low harmful gas emission. Regulation to the lambda value $\lambda=1$ is carried out for this purpose. The inlet-valve opening durations are utilized for regulation due to the absence of throttle valves in the internal combustion engine described. By regulating to the lambda value $\lambda=1$, combustion can take place under stoichiometrically highly favorable conditions, a process notable for its lower pollutant emission, in particular lower proportion of carbon monoxide.

SUMMARY OF THE INVENTION

An object of the present invention is to provide a method for the reduction of harmful exhaust-gas emissions of a spark-ignition engine operated with a lean fuel/air mixture and having direct fuel injection. The jump to air ratios of $\lambda<1$ and back to a lambda value $\lambda>1$, this jump being necessary for regenerating the catalyst, can be carried out as quickly as possible, particularly when the engine is in stratified-charge mode with higher lambda values, such as, for example, >3, in order to avoid misfires, consumption losses and an increase in pollutant emissions.

This object is achieved, according to the invention, by a method in which in a first step, the air quantity in a combustion space is reduced by means of changes in the valve control times and, in a second step, a jump, rapid in time, from the stratified-charge mode to the homogeneous mode takes place, a lambda value $\lambda<1$ being set or in a first step, the air quantity in the combustion space is reduced by means of throttling devices, located near the combustion space, in at least one of two intake ducts leading to the combustion space and, one intake duct being shut off for this purpose, and, in a second step, a jump, rapid in time, from the stratified-charge mode to the homogeneous mode takes place, a lambda value $\lambda<1$ being set.

Shifting the location in order to reduce the air quantity in the intake region of a combustion space which also includes the intake region itself achieves short paths and therefore short reaction times in the event of changes in air quantity. This solution can be achieved by two or three measures having the same effect, specifically, on one hand, by changes in the valve control times, in which the desired reduction in the air quantity can be carried out either by early closing of inlet valves after top dead center or by delayed closing of inlet valves after bottom dead center of the piston in the combustion space.

As an alternative, throttle members, for example in the form of shut-off valves, may be provided in the intake ducts leading to the combustion spaces, preferably as near as possible to the inlet region into the combustion space. If, for example, two intake ducts are present for each combustion space, the air-quantity reduction can also be achieved by cutting off one intake duct by means of an appropriate control.

BRIEF DESCRIPTION OF THE DRAWINGS

Other objects, advantages and novel features of the present invention will become apparent from the following detailed description of the invention when considered in conjunction with the accompanying drawings.

DETAILED DESCRIPTION OF THE DRAWINGS

Figure 1:
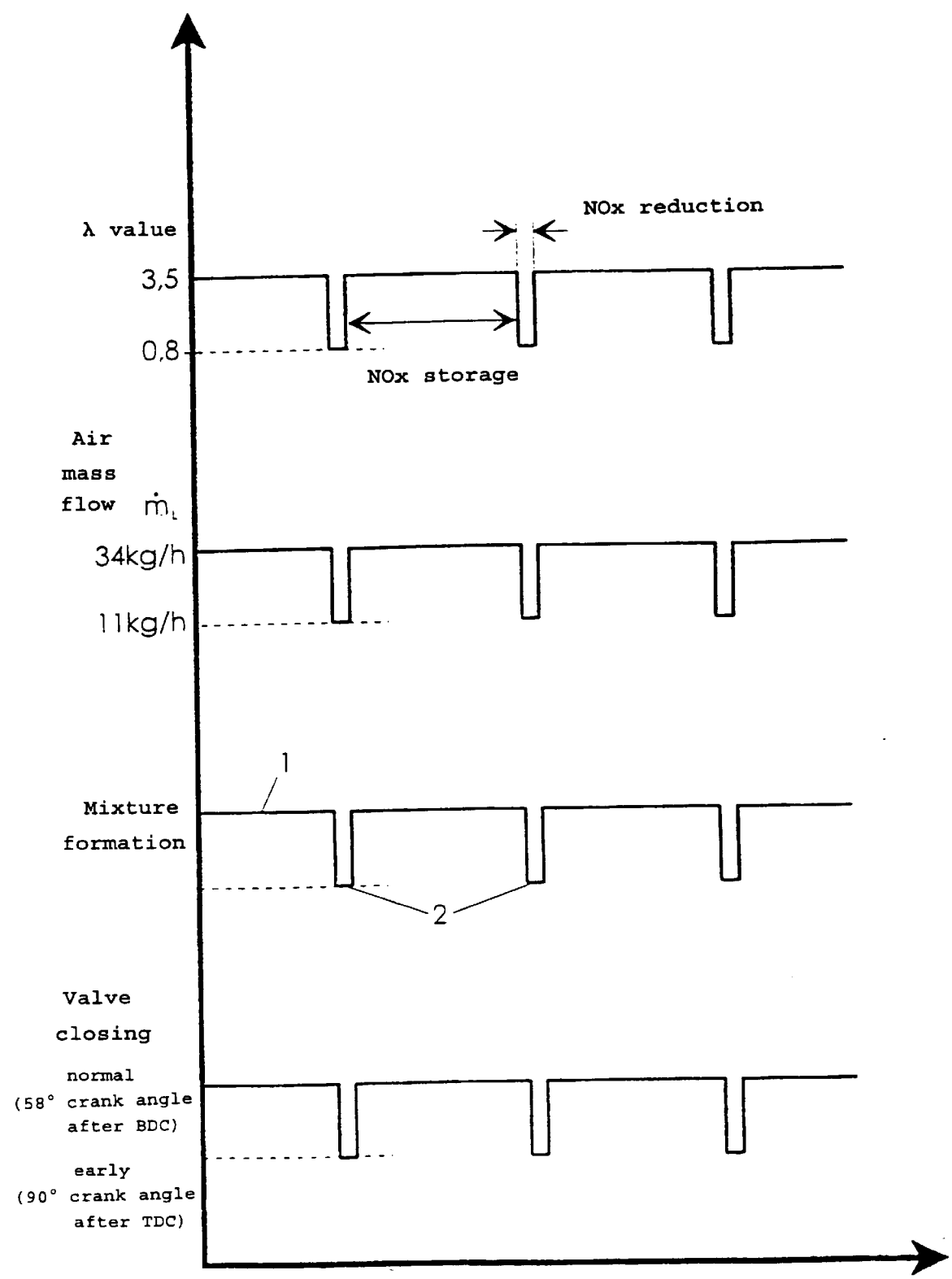
FIG. 1 is a graph of various lambda values and air throughput values.

FIG. 1 illustrates an example of a procedure for regenerating an NOx storage catalyst when an engine is running at 2000 revolutions per minute, with the lambda values, air mass flows, mixture formation and valve closing being illustrated in relation to one another on the ordinate and the time being illustrated on the abscissa.

As is evident, $\lambda=3.5$ is indicated in the uppermost curve as the initial value in the stratified-charge mode. NOx storage in the catalyst takes place in this range. After a specific amount of time, in the present embodiment, a jump from the lambda value $\lambda=3.5$ to $\lambda=0.8$ is carried out and this value is maintained for a short time. NOx reduction takes place during this time. A change is subsequently made again to the lambda value $\lambda=3.5$ in a jump.

The next curve shows the accompanying air mass flows. This illustrates, for example, that in the lean-burn mode, there is an air mass flow of 34 kg/h, this corresponding to unthrottled operation. By a reduction in the air mass flow to 11 kg/h, the engine is run in a throttled and homogeneous mode briefly for the time in which the lambda value $\lambda=0.8$. The air mass flow is subsequently raised to the original value again, together with the accompanying lambda value $\lambda=3.5$.

The next curve illustrates mixture formation. Here, the initial straight line 1 illustrates the stratified-charge mode in the case of the lambda value indicated above and the accompanying air mass flow. Homogeneous operation takes place during NOx reduction at the lambda value $\lambda=0.8$ indicated and with the air mass flow 11 kg/h. This is illustrated by the reference "2". After NOx reduction, there is a return to curve 1 again in a jump.

The lowermost curve shows the closing of an inlet valve over time. In the lean-burn mode, the valve closes, for example, in a crankshaft position of 58° after BDC (bottom dead centre of the piston). With the aid of a variable valve control, for example an electromagnetic valve control, the air ratio can be changed in a desired way from one work cycle to the next. During unthrottled operation, specifically in the stratified-charge mode, in this embodiment, the engine is operated with conventional control times.

During the jump to $\lambda<1$, the air quantity in the cylinder is reduced by a variation in the control times for the inlet valves. Two possible methods are envisaged for this purpose:

1. Early closing of the inlet valve or inlet valves:
   In this case, the inlet valve is closed at an early stage when the desired reduced air quantity is reached in the cylinder. In this way, no throttle losses occur. As indicated in the lowest of the curves in FIG. 1, this early closing can be achieved, for example, in a crankshaft position of 90° after TDC (top dead center of the piston). This early closing is carried out as a jump as long as NOx reduction is to take place.
2. Later closing of the inlet valve:
   In this case, some of the intake air is ejected again, until the desired reduced air quantity is reached in the cylinder, and only then is the inlet valve closed. Late closing can take place, for example, in a crankshaft position of 90° after BDC (bottom dead center), with the result that the air quantity previously taken in is partially ejected again during the compression stroke of the piston before the closing of the inlet valve.

Figure 2:
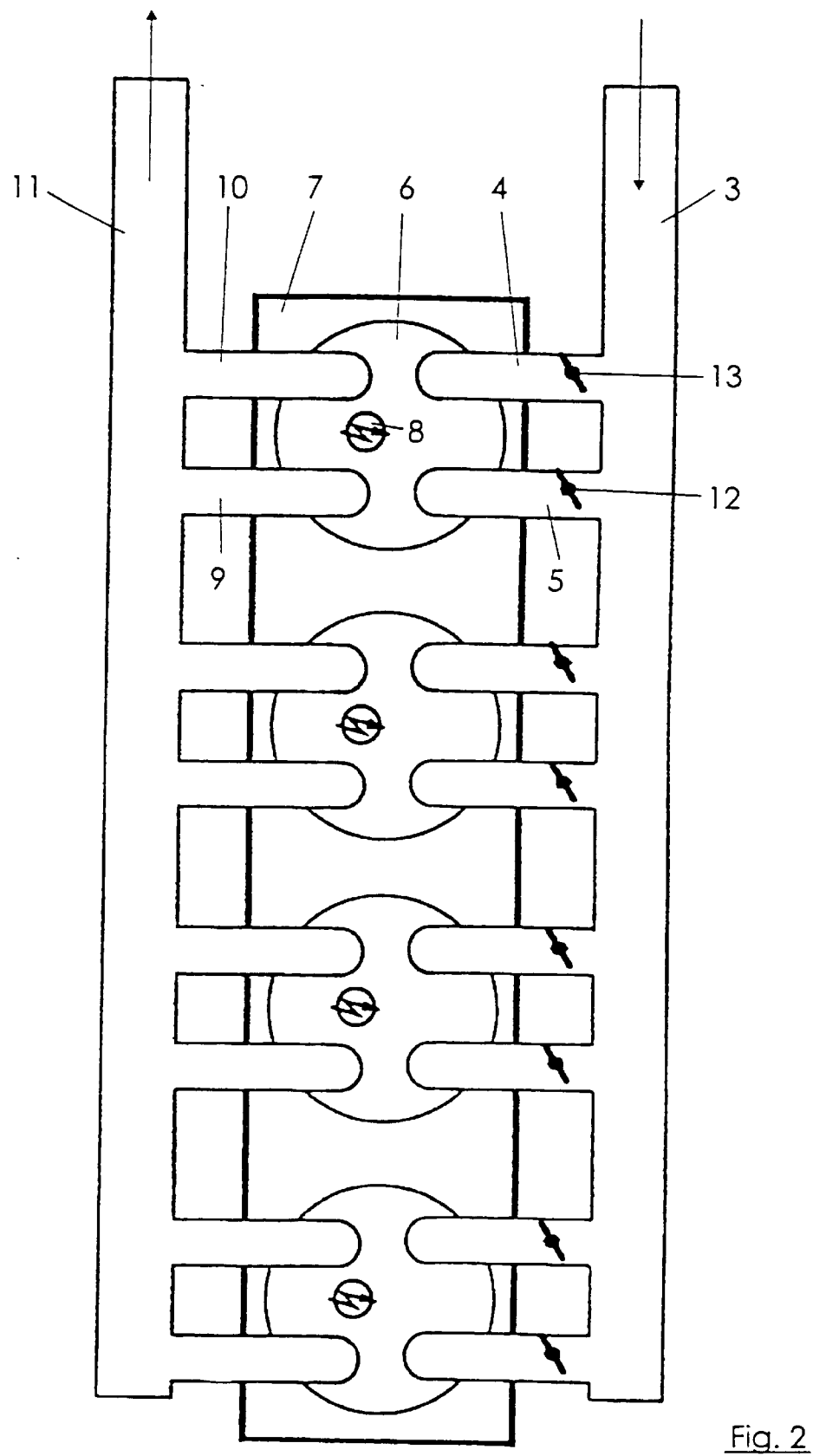
FIG. 2 is a schematic plan view of the intake and outlet region of a spark-ignition engine with throttle members.

FIG. 2 illustrates another possibility for achieving an air-quantity reduction in the intake region of the combustion space. Two intake ducts 4, 5 lead from a main duct 3 to a combustion space 6 of a cylinder of a spark-ignition engine 7 which is schematically illustrated. A 4-cylinder engine is illustrated, only one cylinder together with the accompanying combustion space 6 and with the conduits being given reference symbols for the sake of simplification.

A spark plug 8 is located in each combustion space 6. Two outlet ducts 9, 10 in each case open into a common outlet header 11. Throttle members in the form of shut-off valves 12, 13 are located as a throttling device in each of the two intake ducts 4, 5. However, it is, of course, not necessary for there to be a shut-off valve 12 or 13 in each of the two intake ducts 4, 5. If appropriate, it is also contemplated to have only a single shut-off valve which, in this case, allows a throttled air throughput through one of the two intake ducts 4, 5.

If there is only one inlet duct 4 or 5 for each combustion space 6, then only air-quantity reduction by way of a corresponding position of the shut-off valve 12 or 13 is carried out by the shut-off valve 12 or 13, and there is no complete shut-off.

The alternation between the operating modes "stratified-charge mode" and "homogeneous mixture mode" may also be used for burn-off, that is for removing deposits in the combustion space 6, in particular on the spark plug 8 and on an injection nozzle which is not illustrated.

It is, basically, also contemplated to carry out the reduction of the air mass flow and the transition from the stratified-charge mode to a homogeneous mixture mode in a plurality of steps. This can take place, for example, by a transition from the unthrottled mode with charge stratification and a lambda value of, for example, $\lambda=3.5$ into a throttled mode with low lambda values in a first step. This can be carried out, for example, up to a lambda value of 1.5. At this value, the change to the homogeneous mode then takes place by a change of the fuel injection timing from a late point, that is shortly before ignition by the spark plug 8, to an earlier point, thereby achieving a homogeneous mixture in the combustion space 6. This change could also be carried out by the "normal" throttle valve, in which a transition is then made from charge stratification to homogeneous model at a lambda value of approximately $\lambda=1.5$.

The further reduction in the air quantity to the necessary lambda value of $\lambda<1$, in order to achieve NOx reduction, is then subsequently carried out in the desired way.

The foregoing disclosure has been set forth merely to illustrate the invention and is not intended to be limiting. Since modifications of the disclosed embodiments incorporating the spirit a nd substance of the invention may occur to persons skilled in the art, the invention should be construed to include everything within the scope of the appended claims and equivalents thereof.

What is claimed is:

1. A method for reduction of harmful exhaust-gas emissions of a spark-ignition engine operated with a lean fuel/air mixture and having direct fuel injection, comprising the steps of operating the engine under part load in stratified-charge mode with a lambda value of $\lambda>1$, and to reduce nitrogen oxides adsorbed on a catalyst, carrying out a transition to a homogeneous mode with air ratios of $\lambda<1$ at specific intervals by at least one of throttling of the air quantity supplied and by an increase in the fuel injection quantity, wherein, in a first step, the air quantity in a combustion space (6) is reduced by changes in valve control times and, in a second step, a rapid jump from the stratified-charge mode to the homogeneous mode takes place, with a lambda value $\lambda<1$ being set.

2. The method according to claim 1, wherein the reduction in the air quantity is carried out by delayed closing of inlet valves after bottom dead center of a piston in the associated combustion space.

3. The method according to claim 1, wherein the reduction in the air quantity is carried out by early closing of inlet valves after top dead center of a piston in the associated combustion space.

4. A method for reduction of harmful exhaust-gas emissions of a spark-ignition engine operated with a lean fuel/air mixture and having direct fuel injection, comprising the steps of operating the engine under part load in stratified-charge mode with a lambda value of $\lambda>1$, and, to reduce nitrogen oxides adsorbed on a catalyst, carrying out a transition to a homogeneous mode with air ratios of $\lambda<1$ at specific intervals by at least one of throttling of an air quantity supplied and by an increase in the fuel injection quantity, wherein, in a first step, the air quantity in a combustion space (6) is reduced by throttling devices, located adjacent the combustion space, in at least one of two intake ducts (4, 5) leading to the combustion space (6) and, shutting off one intake duct (4 or 5), and, in a second step, a rapid jump from the stratified-charge mode to the homogeneous mode takes place, with a lambda value $\lambda<1$ being set.

* * * * *